United States Patent [19]

Matsubara et al.

[11] Patent Number: 5,799,241
[45] Date of Patent: Aug. 25, 1998

[54] RADIO APPARATUS

[75] Inventors: Akihiro Matsubara, Kasuga; Masahiro Shigyo, Chikushi-gun, both of Japan

[73] Assignee: Matsushita Electric Industrial Co., Ltd., Osaka, Japan

[21] Appl. No.: 592,788

[22] Filed: Jan. 26, 1996

[30] Foreign Application Priority Data

Jan. 27, 1995 [JP] Japan .................. 7-011744

[51] Int. Cl.⁶ ........................................ H04B 15/00
[52] U.S. Cl. ........................................ 455/62; 455/161.1
[58] Field of Search ............... 379/61, 58; 455/62, 455/161.1, 161.3, 88, 34.2

[56] References Cited

U.S. PATENT DOCUMENTS 4,622,695 11/1986 Whiting .................... 379/58
5,044,010 8/1991 Frenkiel et al. ............ 379/61
5,363,428 11/1994 Nagashima ................. 379/61
5,627,883 5/1997 Maeda et al. .............. 379/61

FOREIGN PATENT DOCUMENTS 4-341024 11/1992 Japan .

Primary Examiner—Amelia Au
Attorney, Agent, or Firm—Ratner & Prestia

[57] ABSTRACT

A radio apparatus using a limited channel scan mode is provided. In the limited channel scan mode, a parent unit scans for transmitting within a limited channel group determined on the basis of the last channel used, and a child unit intermittently scans for receiving within the same limited channel group. Since not all channels are scanned, the working time of the child unit during one scan period is shortened and the battery power is saved. When interference occurs during communication, the channel being used is switched and the channel group thereafter is thus also changed.

14 Claims, 9 Drawing Sheets

| | | 1ch | 2ch | 3ch | 4ch | 5ch | 6ch | 7ch | 8ch | 9ch | 10ch | 11ch | 12ch | 13ch | — — — | 30ch |
|---|---|---|---|---|---|---|---|---|---|---|---|---|---|---|---|---|
| CARDINAL CHANNELS | 1ch | ○ | | | ○ | | | ○ | | | ○ | | | ○ | | |
| | 2ch | | ○ | | | ○ | | | ○ | | | ○ | | | | |
| | 3ch | | | ○ | | | ○ | | | ○ | | | ○ | | | |
| | ⋮ | | | | | | | | | | | | | | | |

FIG. 8

| CARDINAL CHANNELS | 1ch | 2ch | 3ch | 4ch | 5ch | 6ch | 7ch | 8ch | 9ch | 10ch | 11ch | 12ch | 13ch | --- | 30ch |
|---|---|---|---|---|---|---|---|---|---|---|---|---|---|---|---|
| 1ch | ○ |  |  | ○ |  |  | ○ |  |  | ○ |  |  | ○ |  |  |
| 2ch |  | ○ |  |  | ○ |  |  | ○ |  |  | ○ |  |  |  |  |
| 3ch |  |  | ○ |  |  | ○ |  |  | ○ |  |  | ○ |  |  |  |
| --- |  |  |  |  |  |  |  |  |  |  |  |  |  |  |  |

ODD NUMBER CHANNEL GROUPS

EVEN NUMBER CHANNEL GROUPS

RADIO APPARATUS

BACKGROUND OF THE INVENTION

The present invention relates to radio apparatuses that use a multichannel access (MCA) method including cordless telephones.

Radio apparatuses using a multi-channel access method have been widely used and are provided with a lot of channels (for example, 30 channels). When one terminal scans by switching channels among the many channels and transmits a signal and the other terminal receives the transmitted signal, communication between the two terminals starts. When one terminal transmits through a fixed channel, the other terminal scans by switching channels to receive a signal, and if a signal is received, communication starts.

In conventional radio apparatuses using an MCA method, especially cordless telephones composed of a base terminal, or a parent unit, and a mobile portable terminal, or a child unit, an intermittent receiving method in which the receiver of the child unit is intermittently placed in receive mode is widely used for reducing the power consumption when the receiver section of the child unit receives a transmitted signal from the transmitter section of the parent unit.

For the intermittent receiving method, power for operating a receiver is intermittently supplied to the receiver, and the receiving action is performed intermittently with predetermined pause intervals.

When the channel is not known from which a calling signal is sent from a parent unit, the child unit must scan all the channels to receive the calling signal from the parent unit. In this example, every one action of the receiver section requires access-scanning of 30 channels. FIG. 6 shows a repeating state of an intermittent receiving mode in which all channels are access-scanned on a time coordinate axis.

When the power supplied to a receiver rises, all channels are checked to determine if they can receive a signal. The channels are checked by switching the channels among a first channel, a second channel, a third channel, . . . , a twenty-ninth channel, a thirtieth channel.

As said above, in an MCA method using a conventional intermittent receiving mode, all channels are scanned for receiving at specific time intervals, and are checked to determine whether a calling signal from the base transmitter exists in each of the channels or not, and changes the status to radio link action.

In this case, time is required for sending data to set all the channels to a phase locked loop, one channel by one channel, to lock and stabilize all the channels. Moreover, judging time is required to detect whether a call out signal received at each channel is a normal signal transmitted from the parent unit or not. The greater the number of channels to be accessed, the more time in receiving mode for access-scanning is needed.

The access-scanning to respective channels has to be done periodically in specific time periods, with the interval between a rising of the receiving mode and the next rising of the receiving mode defined. The longer the time of the receiving mode becomes, the shorter the pause mode becomes. Power has to be supplied to the receiver during scanning, so the power consumed in the receiver is large and much energy saving is not expected despite the intermittent receiving.

A child unit is generally driven by a battery, so it desirable to keep the child unit in a stand by condition for a longer time without consuming much power and linking by catching a transmitting signal from a base transmitter quickly and surely. Advantages of the present invention include saving time for scanning during receiving, decreasing the time needed for establishing link, and decreased power consumption during waiting.

SUMMARY OF THE INVENTION

The present invention provides a radio apparatus capable of solving the conventional problems described above, that is, achieving power saving during intermittent receiving and high speed link settling.

An exemplary radio apparatus of the present invention comprises a parent unit and a child unit including a transmitter/receiver section for transmitting to / receiving from the parent unit.

According to a first exemplary embodiment of the radio apparatus, the child unit comprises:

a transmitter/receiver section for transmitting to/receiving from the parent unit;

first control means for controlling the transmitter/receiver section to receive and scan within a limited channel group composed of the channels which are included in all of the channels through which the transmitter/receiver section can transmit/receive, and which includes a smaller number of channels than all the channels, the first control means also for confirming a calling signal from the parent unit; and second control means for determining a new limited channel group using the channels at the time when the link between the parent unit and the child unit is settled as the cardinal point.

According to a second exemplary embodiment of a radio apparatus of the present invention, the child unit comprises:

the first control means; and, third control means for changing the limited channel group when a channel is busy and automatically switched to another channel.

According to a third exemplary embodiment of a radio apparatus of the present invention, the child unit comprises:

the first control means;

the second control means; and, fourth control means which at first sends a channel selected from the limited channel group to be scanned by the first control means of the child unit to the first transmitter/receiver section when the child unit calls the parent unit, and which judges if the channel is usable or not, and, if usable, sends a signal to the parent unit through the channel, and if the channel is not usable or there is no normal response from the parent unit through the channel, searches for a usable channel among all the channels to send a signal to the parent unit.

According to a fourth exemplary embodiment of a radio apparatus of the present invention, a parent unit is connected to a cable line and a child unit communicates with the parent unit by radio. The child unit comprises:

a first transmitter/receiver section for transmitting/receiving with the parent unit through a radio channel, the first transmitter/receiver section capable of accessing a plurality of radio channels;

the first control means, and the second control means.

The parent unit comprises:

a second transmitter/receiver section for transmitting/receiving with the child unit through a radio channel;

the second transmitter/receiver section capable of accessing a plurality of radio channels; and fifth control means for controlling the second transmitter/receiver section in order to call the child unit using a channel in a limited channel group to be scanned by the first control means of the child unit when calling of the child unit is needed.

According to a fifth exemplary embodiment of a radio apparatus of the present invention, a parent unit is connected to a cable line and a child unit is used for communicating with the parent unit by radio. The child unit comprises:

the first transmitter/receiver section;

the first control means;

first memory means for memorizing a channel number for transmitting and receiving;

the second control means;

sixth control means in which, when signal transmission from the child unit to the parent unit is desired, a channel number stored in the first memory means is read out and the receiving channel of said first transmitter/receiver section is tuned to the channel number, and it is determined whether the channel is usable or not. If the channel is usable, a signal is sent to the parent unit through the channel, and if the channel is not usable or there is no normal response from the parent unit through the channel, the channel is switched to another channel in the limited channel group and it is determined whether the channel is usable or not. If the channel is usable, a signal is sent to the parent unit through the channel.

The parent unit comprises:

a second transmitter/receiver section which can access a plurality of channels and performs transmitting/receiving with the child unit through a radio channel;

second memory means for memorizing a channel number for transmitting and receiving;

seventh control means for maintaining a receiving state with the transmitting and receiving channel of the second transmitter/receiver section tuned to the channel number stored in the second memory means, in a waiting state;

eighth control means in which, when calling the child unit is desired, a channel number stored in the second memory means is read out and the receiving channel of the second transmitter/receiver section is tuned to the channel number. It is determined whether the channel is usable or not, and if the channel is usable, a signal is sent to the child unit through the channel, and if the channel stored in the second memory means is not usable, the channel is switched to another channel in the limited channel group at that time and it is determined whether the channel is usable or not. If the channel is usable, a signal is sent to the child unit through the channel. A usable channel is searched from among the limited channel group at that time to send a signal to the child unit; and, ninth control means for storing the channel number at the moment when a radio link is connected between the parent unit and the child unit into said second memory means.

In the above exemplary embodiments, the first control means may perform intermittent receiving which receives signals at predetermined intervals.

In the above exemplary embodiments of the present invention, scanning is limited within a limited channel group, that is, not all usable channels but some of the channels are scanned. The operation time of a receiver section of a child unit is thus short in one period scanning, and the time for link connection can be shortened.

Accordingly, by using the present invention in parallel with the intermittent receiving method, power can be saved, especially, the battery life of a battery powered child unit can be lengthened.

Furthermore, according to the present invention, when there is interference or the like, the channel being used is switched. Accordingly, the channel group to be scanned for receiving is also switched. Therefore, as time passes, all usable channels are equally used, that is, all channels are effectively used.

BRIEF DESCRIPTION OF THE DRAWINGS

FIG. 8 is an illustrative diagram showing an example of determining a limited scan channel group in a radio apparatus of embodiment 1 of the invention.

PREFERRED EMBODIMENTS OF THE INVENTION

Hereafter, an exemplary cordless telephone will be illustrated as an embodiment of the present invention with reference to the drawings.

(Embodiment 1)

Figure 1:
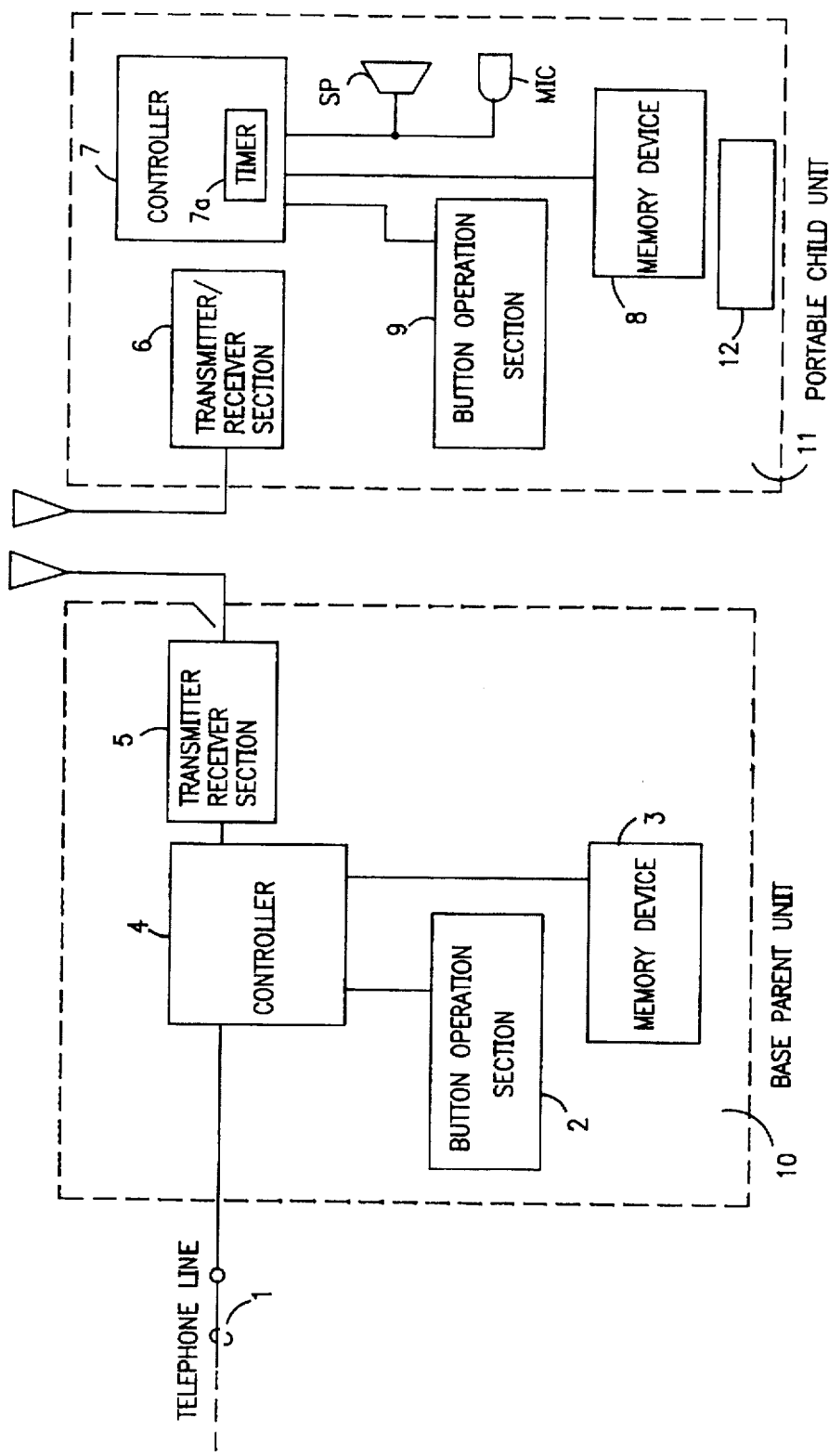
FIG. 1 shows a block diagram of a radio apparatus of embodiment 1 of the invention.

In FIG. 1, 10 is a base terminal, or parent unit of a cordless telephone, 11 is a portable terminal, or child unit, and 1 indicates a telephone line.

In parent unit 10, transmitter/receiver section 5 converts speech signals and control signals to radio signals and transmits them, and demodulates speech signals and control signals from received signals and outputs them. Controller 4 detects the input/output of telephone line 1 and the operation of button operating section 2, and controls memory device 3 and transmitter/receiver section 5.

In child unit 11, transmitter/receiver section 6 converts control signals and speech signals inputted from a microphone MIC into radio signals and transmits them, and demodulates the speech signals and control signals from received signals and outputs them to speaker SP and controller 7. Controller 7 detects the operation of button operating section 9 and controls memory device 8 and transmitter/receiver section 6. Controller 7 is provided with a timer 7a for controlling intermittent receiving by ordering signals to be periodically sent to transmitter/receiver section 6. Child unit 11 is operated by battery 12.

The actions of the exemplary radio apparatus of the invention as described above will be illustrated below.

In the exemplary embodiment, suppose that the transmitting/receiving channels are all duplex lines, 30 pairs of channels are prepared, and child unit 11 is in a waiting state for a transmitting signal from the parent unit 10 except when the child unit 11 is in the communication state. In the waiting state, receiving-scans for confirming opposite units' transmitting signals are performed in order to form a radio link between parent unit 10 and child unit 11.

Figure 7:
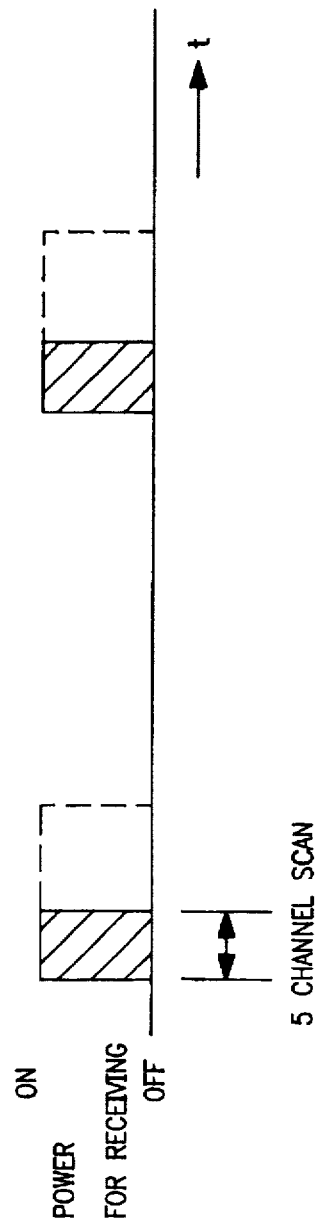
FIG. 7 shows a time chart of the intermittent receiving in limited channel scanning according to the present invention.

The embodiment uses an intermittent receiving method. For example, as shown in FIG. 7, the power supply for receiving a signal at transmitting/receiving section 6 is increased at specific time intervals by timer 7a to check if a transmitting signal from parent unit 10 is transmitted into the channels within a limited scan channel group.

Among a channel space of 30 channels, for example, every sixth one of them, that is, every 5 channels, form a group, and this group is defined as a limited channel group. A channel which is scanned first at every power supply increase is defined as a cardinal channel. Starting from the cardinal channel, channels in a limited scan group are scanned. At the next scan, a different limited scan group is scanned. This method is defined as a limited scan.

When the power supply for receiving rises, if the cardinal channel is a first channel, the first channel is scanned first, then channels are scanned at intervals of 3, such as a fourth channel, seventh channel, tenth channel, thirteenth channel, . . . , etc., and it is determined if the channels within a predetermined limited scan group receive a signal. When no signal is found in the limited scan group, the power supply for transmitter/receiver section 6 stops, and transmitter/receiver section 6 changes to a pause mode.

Figure 2:
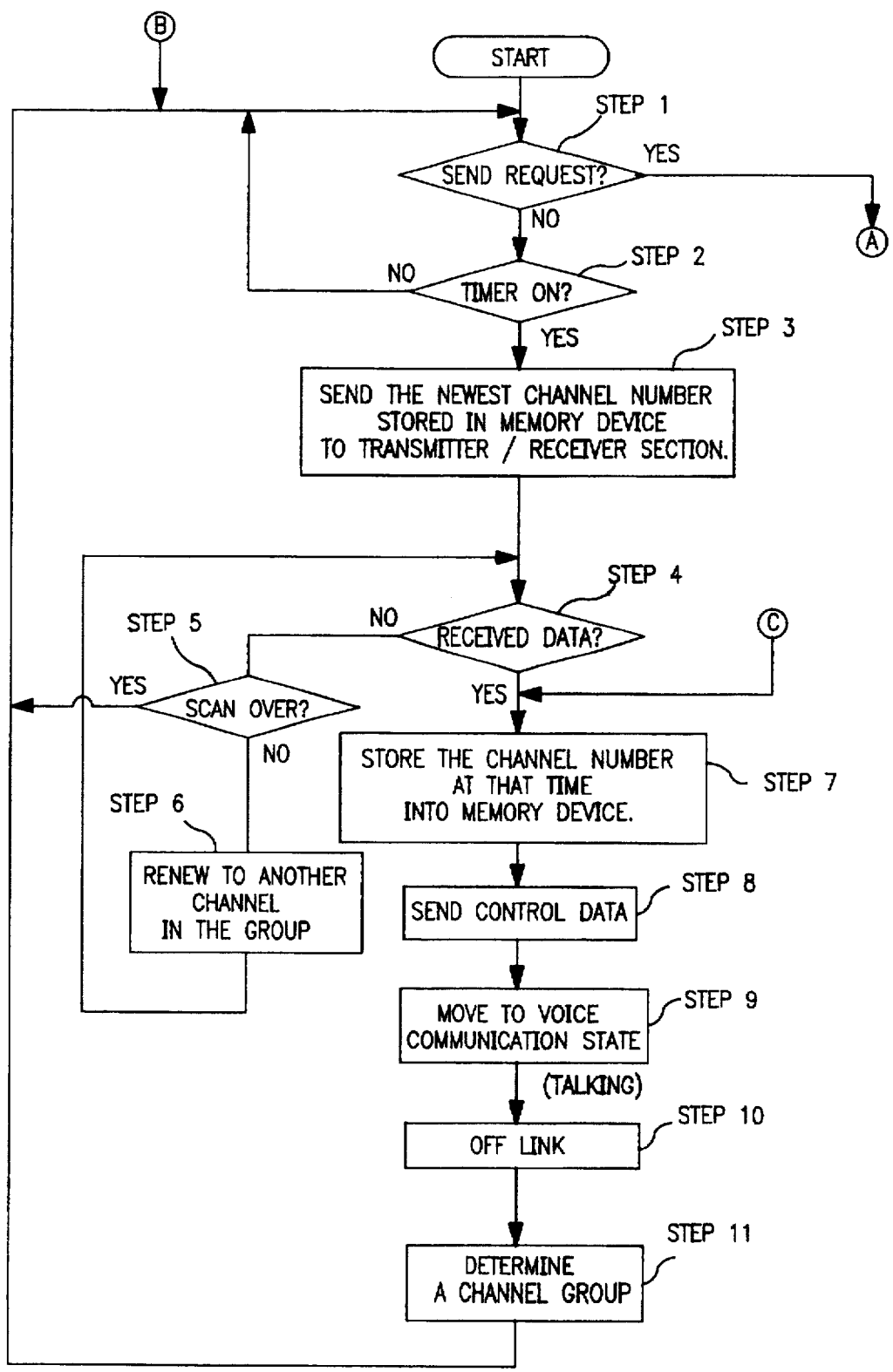
FIG. 2 is a flow chart showing the control procedure of the child unit of a radio apparatus of the embodiment 1.
Figure 3:
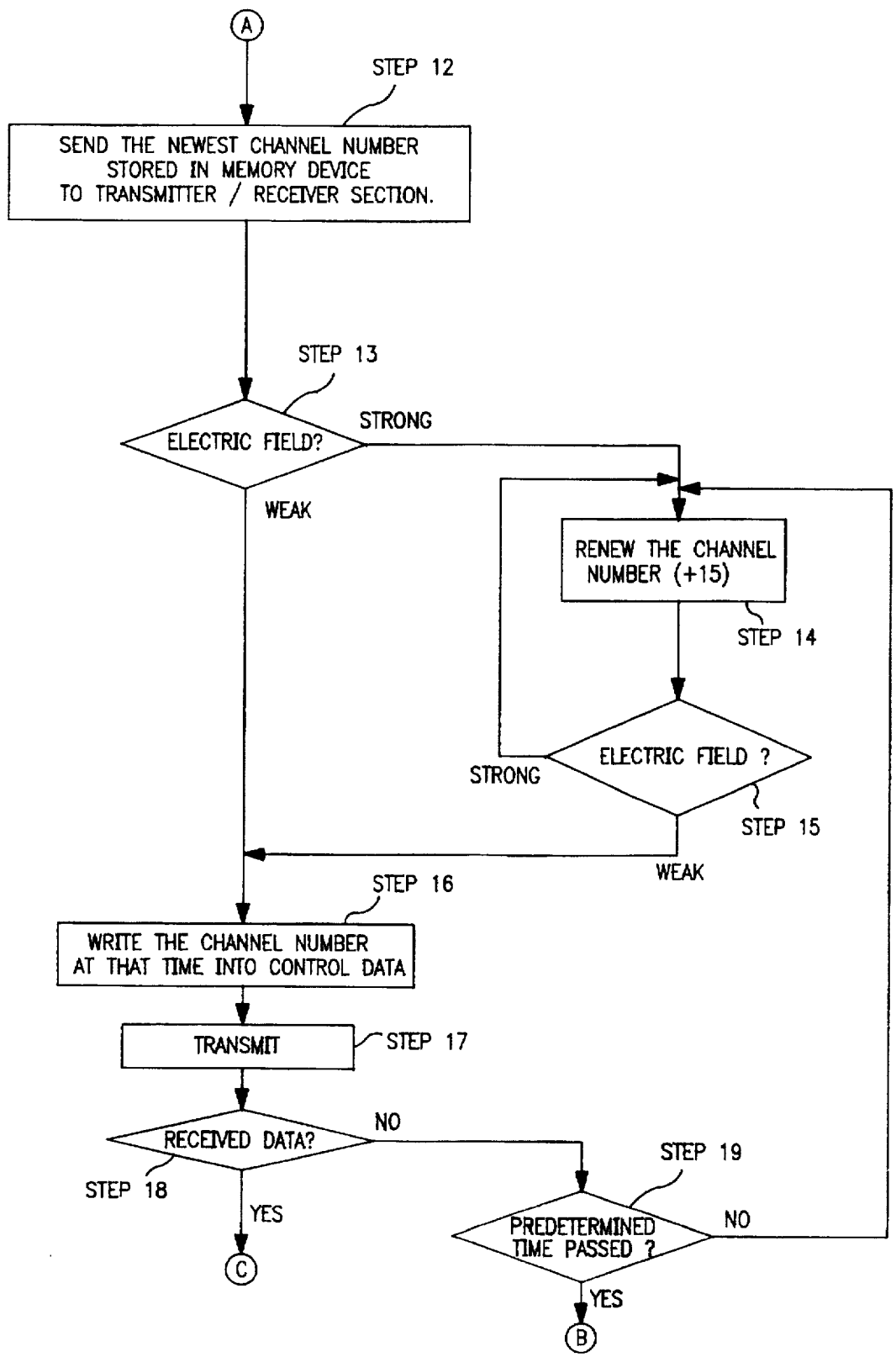
FIG. 3 is a flow chart showing the control procedure of the child unit of a radio apparatus of the embodiment 1.

FIG. 2 and FIG. 3 are flow charts showing control procedures of a child unit 11 of a radio apparatus of embodiment 1 of the invention. First, a waiting state is described referring to the flow charts. In FIG. 2, it is determined at step 1 whether a send request from a user exists or not, and if a request exists, the procedure goes to FIG. 3. If there is no request, at step 2 it is determined whether timer 7a for intermittent receive control is on or not. If timer 7a is not on, the process returns to step 1. If timer 7a is on at step 2, because the child unit enters a receiving state, the process moves to step 3. At step 3, the channel whose number is stored in memory device 8 is provided to transmitter/receiver section 6 as a cardinal channel to start transmitter/receiver section 6. Here, the number stored in memory device 8 is the number used when a radio link was last formed. step 4, it is determined whether data from parent unit 10 is received or not. If the data is not yet received and the scan does not yet end at step 5, the channel number to be given to transmitter/receiver section 6 is renewed to another channel number within the limited scan channel group, and the process returns to step 4. If all channels within the limited group are scanned at step 5, the receiving state is over and process returns to step 1.

In FIG. 2, when receiving data from parent unit 10 is detected at step 4, the process moves to step 7, and information about the channel number currently receiving is stored in memory device 8. Control data for responding to parent unit 10 is sent through the channel to form a radio link with parent unit 10 at step 8. A circuit for voice communication and the like is operated at step 9 to start a voice communication state. Here, the channel stored in memory 8 at step 7 becomes a cardinal channel thereafter.

The radio link is turned off when a user stops talking at step 10. The limited scan group of the next period is determined by applying the channel number stored in memory 8 at step 11 as the cardinal channel.

Next, the case of transmitting from child unit 11 is described. When a user operates to start transmission, a send request signal is detected at step 1 in FIG. 2, the process moves to step 12 in FIG. 3. Information on the newest channel number stored in memory device 8 is sent to transmitter/receiver section 6 at step 12. The state of the electric field is then checked at step 13 by putting transmitter/receiver section 6 in the receiving state.

When the electric field is determined to be weak at step 13, the channel is recognized as an empty state and the process moves to step 16 for sending control data, as described below. When the electric field is determined to be strong at step the channel is recognized as not available and the channel is switched to another channel. That is, when the electric field is determined to be strong, the channel number to be provided to transmitter/receiver section 6 at step 14 is changed, the transmitter/receiver section 6 operates using another channel, and the electric field in the channel at that time is checked at step 15. For example, the channel number is renewed or changed to "the channel number received at first+15".

When the channel number is renewed and the electric field is determined to be weak at step 15, the process moves immediately to step 16 for sending control data. When the electric field is determined to be strong at step 15, the process returns to step 14, the number is further renewed, and the electric field of the channel is checked.

When the electric field is determined to be weak at step 13 and step 15, the number at that time is written in the control data to be sent to parent unit 10 at step 16, and the send request data is sent to parent unit 10 together with the control data at step 17.

Likewise, when a user performs a transmitting operation, a channel used for transmission is checked to determine whether the channel is empty or not. If the cardinal channel which is checked first is not available, the channel is changed to another channel to transmit a signal.

After the data is sent to parent unit 10, it is determined at step 18 whether response data from parent unit 10 is received or not. When the response data from the parent unit is received, the process moves to step 7 shown in FIG. 2, information about the channel number given to transmitter/receiver section 6 at that time is stored at memory 8, and the process moves to a step for forming a radio link. When the response data from parent unit 10 is not received at step 18, the process returns to step 14, and the channel number to be given to transmitter/receiver section 6 is further renewed. If a predetermined time has already elapsed since the transmission start operation by a user, as determined at step 19, channel renewing and transmission stops and the process returns to step 1 and changes to a waiting state.

Figure 4:
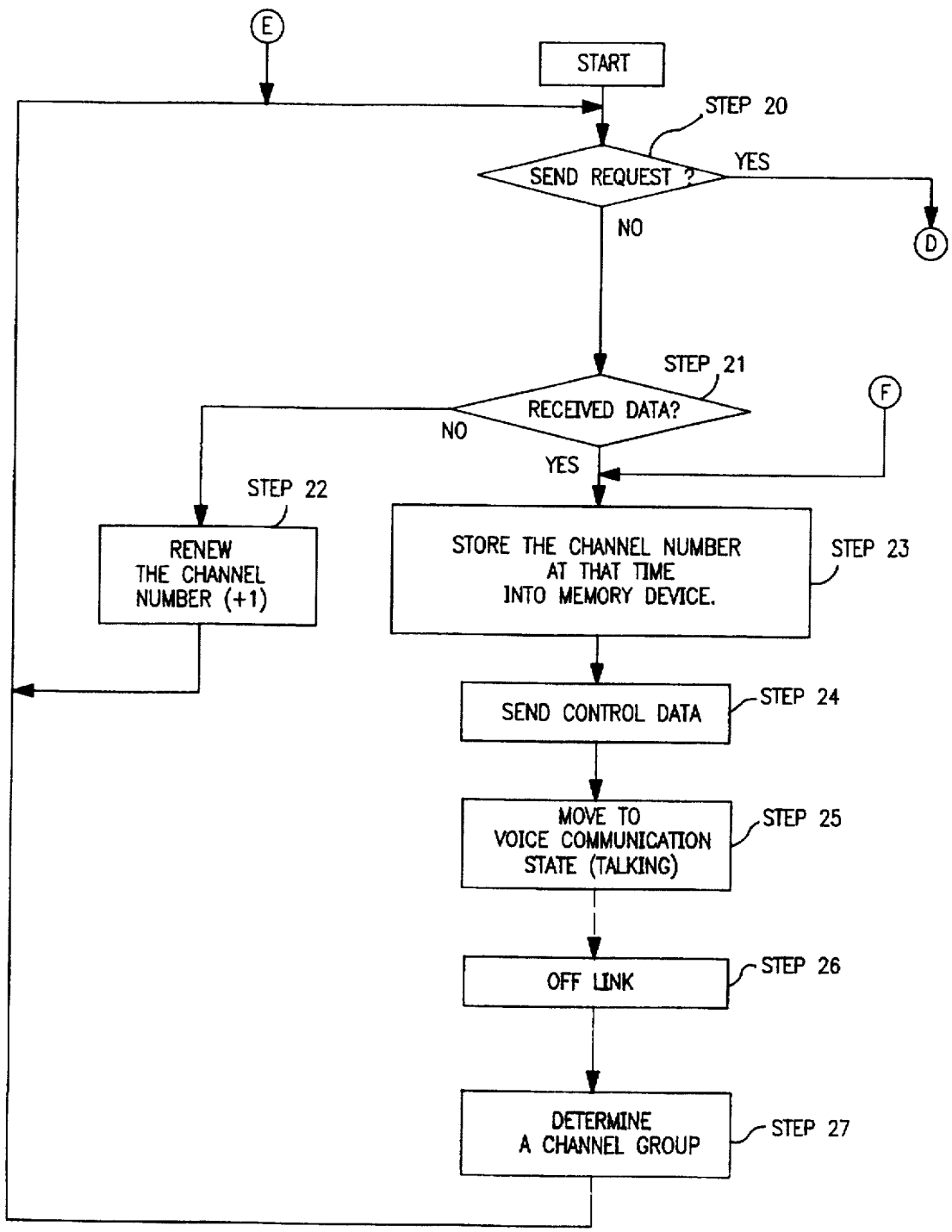
FIG. 4 is a flow chart showing the control procedure of the parent unit of a radio apparatus of the embodiment 1.
Figure 5:
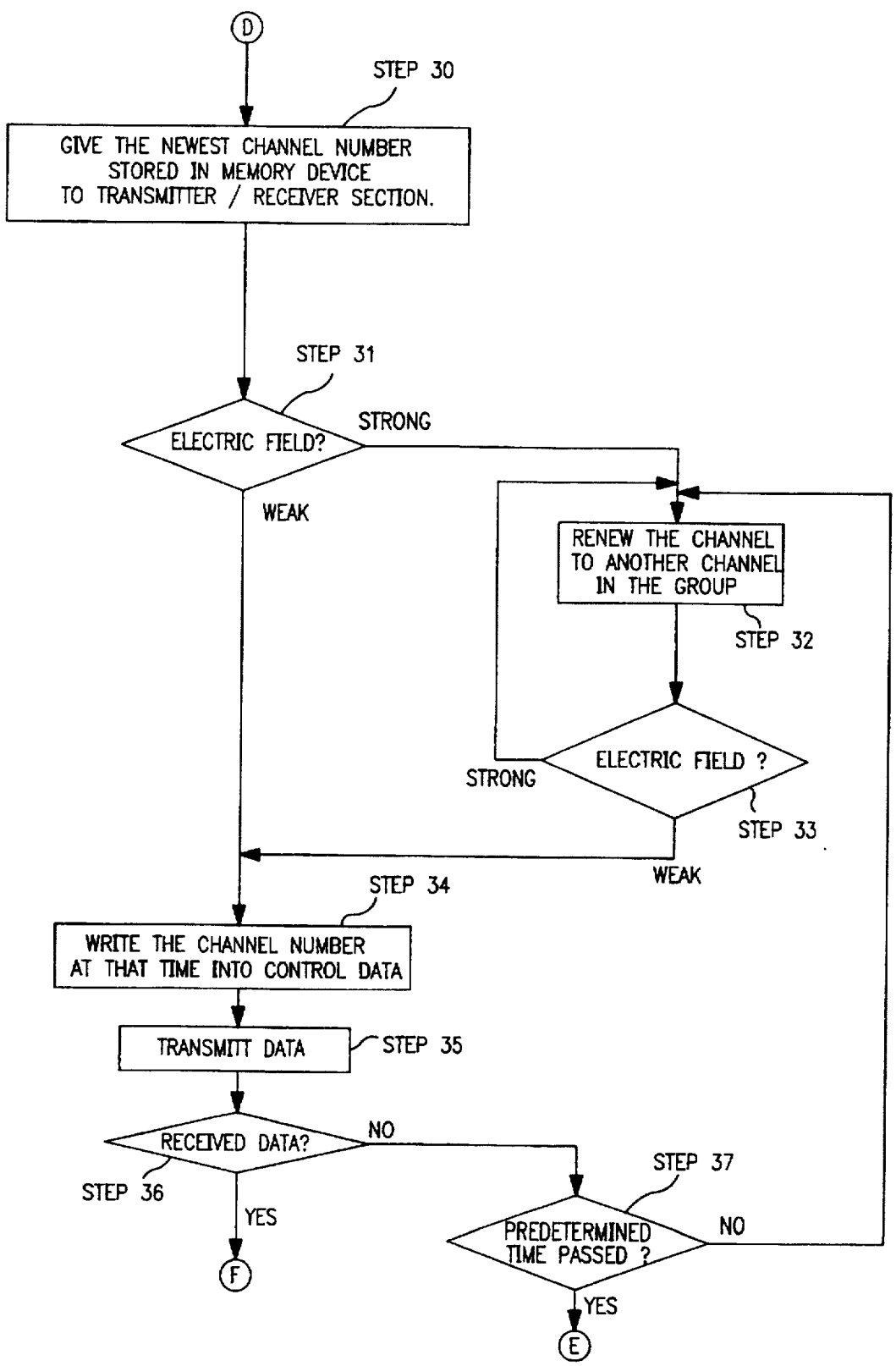
FIG. 5 is a flow chart showing the control procedure of the parent unit of a radio apparatus of the embodiment 1.
Figure 6:
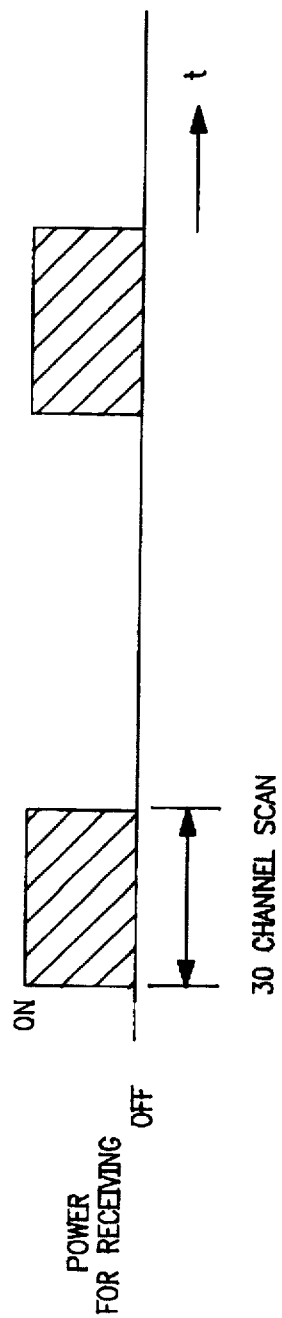
FIG. 6 shows a time chart of the intermittent receiving in all channel scanning of the prior art.

The actions of parent unit 10 are illustrated next. FIG. 4 and FIG. 5 are flow charts showing an exemplary control procedure of the parent unit 10 of the radio apparatus of embodiment 1. A waiting state is first illustrated. At step 20 in FIG. 4, it is determined whether a send request to child unit 11 received through telephone line 1 has been generated or not. If the send request is not generated, the waiting state is maintained. It is determined at step 21 whether control data is received from child unit 11 or not. If the data is not received through that channel, the channel is renewed by adding "1" to the channel number to be given to transmitter/receiver section 5, and whether control data from child unit 11 is received or not is then checked. Likewise, in the waiting state, whether control data from child unit 11 is received or not is checked by switching channel numbers by increments of "1".

When data from child unit 11 is detected at step 21, the process moves to step 23, and information about the channel number given to transmitter/receiver section 5 at that time is stored in memory device 3. At step 24, a radio link is formed by transmitting the control data for responding to child unit 11. A circuit for voice communication or the like is operated at step 25. Processing at steps 26, 27 is the same as steps 10, 11 in FIG. 2 and the description of these steps is omitted for brevity.

The case in which parent unit 10 calls child unit 11 due to the arrival of a message and the like is illustrated next. When a message arrives from a telephone line, the existence of a send request is detected at step 20 in FIG. 4, and the process moves to step 30 in FIG. 5. At step 30, information about the channel number stored at memory device 3 at that time is sent to transmitter/receiver section 5. Transmitter / receiver section 5 receives data at step 31 and checks the electric field at the channel at that time. Here, the channel number given to transmitter/receiver section 5 from memory device 3 is the number used when the radio link was last formed. The condition of the electric field is first checked in the channel last used upon receiving a message from a telephone line.

When the electric field is judged to be weak at step 31, the channel is recognized as being in an empty state and the process moves immediately to the step for sending a control data. When the electric field is judged to be strong at step 31, the channel is recognized as being not available and the process moves to the step in which the channel is switched to another channel. That is, when the electric field is judged to be strong at step 31, the channel number to be given to transmitter/receiver section 5 at step 32 is changed to another number in the limited scan channel group, and the electric field in the renewed channel is checked at step 33. If the electric field is judged to be weak, the process moves to step 34 for sending control data. If the electric field is judged to be strong at step 33, the process returns to step 32 and the channel is further renewed to another channel in the limited scan channel group and the electric field in this new channel is checked.

When the electric field is judged to be weak at step 31 and step 33, the channel number at that time is written in the control data to be sent to child unit 11 at step 34 and data for calling a child unit is sent to child unit 11 together with the control data at step 35.

Likewise, when there is the need for calling child unit 11 from parent unit 10 due to the arrival of a message from a telephone line and the like, parent unit 10 sends the data for calling child unit 11 after determining whether the channel to be used is empty or not. If the cardinal channel which is checked first is not available, the parent unit 10 searches for an empty channel among the limited scan group and transmits through it.

After transmitting the data for calling child unit 11 at step 35, it is determined at step 36 whether response data is sent or not from child unit 11. If response data from child unit 11 is received, the process moves to step 23 in FIG. 4, information about the channel number given to transmitter/receiver section 5 at that time is stored in memory device 3, and the process moves to the step for forming a radio link. If response data from child unit 11 is not received at step 36, the process returns to step 32 through step 37 and the channel number to be given to transmitter/receiver section 5 is renewed. However, if the time from the arrival of the call already exceeds a predetermined time period at step 37, channel renewal and transmission are stopped, and the process returns to step 20 and changes to a waiting state.

A concrete example to determine a limited scan channel group is illustrated next. FIG. 8 is an illustrative table used for determining a limited scan channel group in the present embodiment, and shows cardinal channels and limited scan channel groups corresponding to the cardinal channels.

When limited scan channel groups are determined, the channel which made a radio link the last time is defined as a cardinal channel, and channels by increments of 3 from the cardinal channel are selected, with a total of five channels being set as a limited scan channel group. For example, as shown in FIG. 8, when the cardinal channel is 1, a limited scan channel group includes channel 1, channel 4, channel 7, channel 10, and channel 13; that is, a receiving channel scan is performed in this group including these five channels. When the cardinal channel is 2, a limited scan channel group includes channel 2, channel 5, channel 8, channel 11, and channel 14, and a receiving channel scan is performed in this group.

For example, when the cardinal channel is channel 2, and parent unit 10 transmits to child unit 11, it is first determined whether channel 2 is empty or not. If channel 2, a cardinal channel, has an electric field (for example, another radio apparatus is using the channel), the next channel, channel 5, is checked to determine if it is empty or not. If channel 5 is empty and a radio link between parent unit 10 and child unit 11 is established, the cardinal channel for determining a limited scan group is renewed to the channel 5. In step 11 shown in FIG. 2 and step 27 shown in FIG. 4, a limited scan channel group is decided on the basis of channel 5 of the cardinal point. That is, the cardinal channel is set at the channel in which a radio link was just formed.

When communication between a parent unit and a child unit is over and the radio link is opened, child unit 11 enters an intermittent receiving mode. As described before, the cardinal channel of the scan channel group which was set to the channel when the former radio link was formed is renewed to the channel 5. Accordingly, a limited receiving scan is performed by switching among five channels including channel 5 as the cardinal channel, and channel 8, channel 11, channel 14 and channel 17. On the contrary, when a call is transmitted from child unit 11 to parent unit 10, if the cardinal channel has an electric field, because another radio apparatus is using the cardinal channel and the like, the cardinal channel is thus not available, and the channel number jumps to "+15" and an empty channel is searched for to perform a radio link action. Likewise, when the cardinal channel is not available, the channel is automatically switched to another channel, and electric field detection, transmission and the like are performed. If the channel is automatically switched and a radio link between a parent unit and a child unit is formed, the cardinal channel is renewed. The channel jumps over channels 15 because, if the electric field is strong, even if the channel is switched to a neighboring channel, there is a high probability of a strong electric field, so it is preferable to select a non-neighboring channel.

As described above, a cardinal channel at a time is the channel by which a radio link between a parent unit and a child unit was established therebefore, and when a radio link is established through a channel which is different from the former cardinal channel, the cardinal channel is changed thereafter. Accordingly, if a channel having an electric field exists at a time of a call out, the cardinal channel is changed, and accordingly, the limited scan channel group is changed.

Likewise, the cardinal channel changes according to the situation at the moment and channels to be used move across the entire channel band, so all channel spaces can be used as time passes, and the effective use of the communication paths is thus realized.

As described above, a cordless telephone in accordance with the present embodiment realizes lengthening of the battery life of child unit 11 as compared with a conventional cordless telephone which uses an intermittent receiving method to scan all the channels. For example, the battery life capable of waiting in a stand by condition in the case of an intermittent receiving method which scans all 30 channels is 60 hours, while the battery life of a cordless telephone of the present invention is greatly increased to 168 hours (7 days); thus the battery life of child unit 11 is extended.

Further, by limiting the number of channels to be linked, the receiving hit ratio when receiving-scanning becomes higher, and the time for scanning unnecessary channels can be saved and the time for linking can be shortened.

(Embodiment 2)

The circuit configuration of embodiment 2 is nearly the same as embodiment 1 but the manner of determining a limited scan channel group is different. Assuming 60 channels in the present embodiment, ID codes of an apparatus using an odd channel group and an apparatus using an even channel group are decided. Channels in both the odd channel group and the even channel group are selected by incrementing every 14 channels. A total of 5 channels compose a channel group for limited scan.

Figure 9:
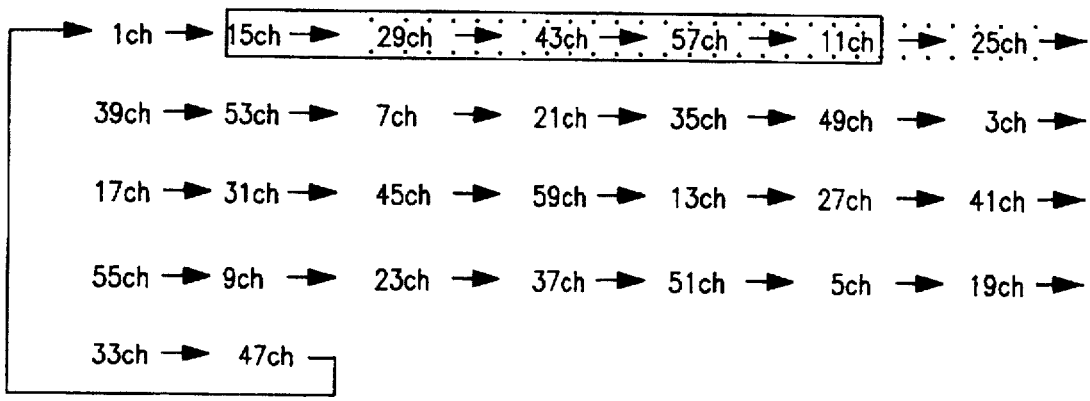
FIG. 9 is an illustrative diagram showing an example of determining a limited scan channel group in a radio apparatus of embodiment 2 of the invention.
Figure 9:
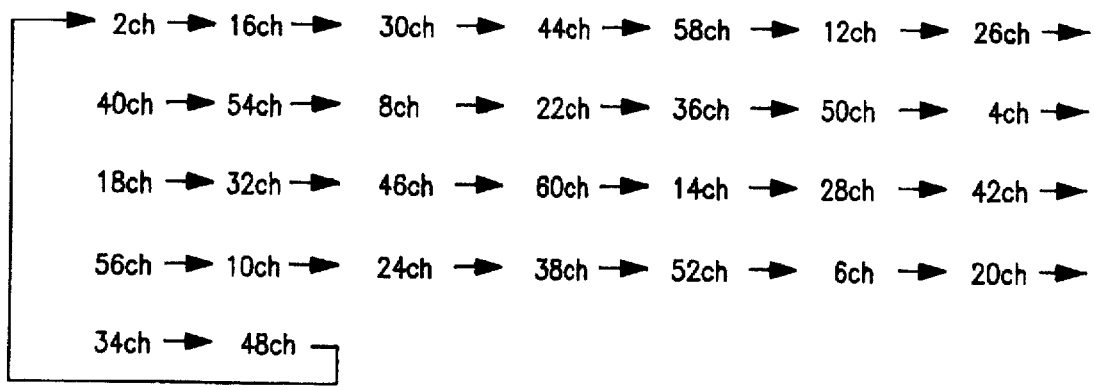

For example, for an apparatus which is to use an odd number channel group by an ID code, supposing channel 15 is the cardinal channel, the limited scan channel group then includes channel 15, channel 29, channel 43, channel 57 and channel 11 in the full line frame in FIG. 9, and the channel scan is performed in this group of five channels. When the cardinal channel is channel 29, the limited scan channel group includes channel 29, channel 43, channel 57, channel 11, and channel 25 in the broken line frame, and the channel scan is performed in this group.

For an apparatus which is to use an even number channel group by an ID code, supposing channel 2 is the cardinal channel in FIG. 9, the limited scan channel group then includes channel 2, channel 16, channel 30, channel 44, and channel 58.

As described above, the channels are selected by incrementing every 14 channels. Channels can be used in the full band of permitted frequency even in limited scanning, so even if noise is generated at part of the band, the probability of interference caused by noise and the like is very small since the limited scan is performed in a wide range.

In the above embodiments, the number of channels to be used and the manner of determining limited scan groups will be not limited to the examples.

A radio apparatus of the invention cannot only have a limited receiving scan method, but also can have a conventional all channel scan method and switches among the methods as required.

As described above, the time for one scan in a radio apparatus of the invention is shorter than that of conventional radio apparatuses which scan all radio channels. Therefore, the operation time of the transmitter/receiver section is shortened which results in power saving. When an apparatus is driven by a battery, the battery life is extended. Additionally, radio channels to be scanned are limited, thus, detection of a call signal from a parent unit becomes faster, so the time for establishing a link between the parent unit and a child unit is shortened.

The present invention will not be limited to the numerical values in the above embodiments and the details of the drawings, and it is to be understood that various changes may be made within the scope of the following claims.

What is claimed is:

1. A radio apparatus comprising:

a parent unit; and a child unit having:

a transceiver for transmitting to said parent unit and receiving from said parent unit over one channel of a plurality of channels, said one channel establishing a radio link between said parent unit and said child unit and determining a cardinal point;

first control means for controlling said transceiver to scan channels for a signal, wherein said channels are scanned in a first limited group which is a subset of the plurality of channels; and second control means for determining a second limited channel group based upon the cardinal point, wherein said parent unit i) scans all of the plurality of channels for a signal indicating a response of said child unit to the signal from said parent unit and ii) establishes a radio link between said parent unit and said child unit.

2. The radio apparatus of claim 1, wherein said first control means controls said transceiver to perform intermittent receiving to scan for the signal at predetermined time intervals.

3. A radio apparatus comprising:

a parent unit; and a child unit having:

a transceiver for transmitting to said parent unit and receiving from said parent unit over one channel of a plurality of channels;

first control means for controlling said transceiver to scan a first channel a signal, wherein said first channel is within a limited group which is a subset of the plurality of channels; and second control means for controlling said transceiver to scan a second channel in said limited group when said first channel is unavailable, and said parent unit i) scans all of the plurality of channels for a signal indicating a response of said child unit to the signal from said parent unit and ii) establishes a radio link between said parent unit and said child unit.

4. The radio apparatus of claim 3, wherein said first control means controls said transceiver to perform intermittent receiving to scan for the signal at predetermined time intervals.

5. A radio apparatus comprising:

parent unit; and a child unit having:

a transceiver for transmitting to said parent unit and receiving from the parent unit over one channel of a plurality of channels, said one channel establishing a radio link between said parent unit and said child unit and determining a cardinal point;

first control means for controlling said transceiver to scan channels for a signal from said parent unit, wherein said channels are scanned in a limited group which is a subset of the plurality of channels;

second control means for determining a second limited channel group based upon the cardinal point; and, third control means which (1) sends a channel selected from the first limited group scanned to said transceiver when said child unit calls said parent unit, (2) determines if the channel is usable or not, (3) sends a control signal to said parent unit through the channel if the channel is usable, and (4) searches for a usable channel if the channel is not usable, and said parent unit i) scans all of the plurality of channels for a signal indicating a response of said child unit to the signal from said parent unit and ii) establishes a radio link between said parent unit and said child unit.

6. The radio apparatus of claim 5, wherein said first control means controls said transceiver to perform intermittent receiving to scan for the response signal at predetermined time intervals.

7. A radio apparatus comprising:

a child unit for performing radio communication with a parent unit, said child unit including:

first transceiver for transmitting to said parent unit and receiving from said parent unit through one radio channel of a plurality of radio channels, said one radio channel establishing a radio link between said parent unit and said child unit and determining a cardinal point;

first control means for controlling said first transceiver to scan a channel for a signal, wherein said channel is within a first limited group which is a subset of the plurality of radio channels;

second control means for determining a second limited group based upon the cardinal point; and said parent unit including:

a second transceiver which accesses said plurality of radio channels and transmits to said child unit and receives from said child unit through the one radio channel;

third control means for controlling said second transceiver to call said child unit using said channel in the first limited group scanned by said first control means of said child unit, and said parent unit i) scans all of the plurality of channels for a signal indicating a response of said child unit to the signal from said parent unit and ii) establishes a radio link between said parent unit and said child unit.

8. The radio apparatus of claim 7, wherein said first control means controls said transceiver to perform intermittent receiving to scan for the signal at predetermined time intervals.

9. A radio apparatus comprising:

a child unit for performing radio communication with a parent unit, said child unit including:

a first transceiver which can access to a plurality of radio channels and for transmitting to said parent unit and receiving from said parent unit through one radio channel of the plurality of radio channels, said one radio channel establishing a radio link between said parent unit and said child unit and determining a cardinal point;

first control means for controlling said first transceiver to scan the radio channels for a response signal, wherein said radio channels are scanned in a first limited group which is a subset of the plurality of radio channels;

first memory means for storing a channel number for transmitting and receiving;

second control means for providing the channel number of the one radio channel into said first memory means and determining a second limited channel group based upon the cardinal point;

third control means which, when signal transmitting from said child unit to said parent unit, (1) reads the channel number stored in the first memory means, and tunes said transceiver to the radio channel, (2) determines if the radio channel is usable or not, (3) sends a control signal to said parent unit through the radio channel if the radio channel is usable, and (4) switches the radio channel to another radio channel in the first limited channel group if the radio channel is not usable, determines if the radio channel is usable or not, and if usable, sends the control signal to said parent unit through the radio channel; and said parent unit including:

a second transceiver which can access the plurality of radio channels and performs transmitting and receiving with said child unit through the one radio channel;

second memory means for storing the channel number for transmitting and receiving;

fourth control means for tuning the transmitting and receiving channel of said second transceiver to the channel number stored in said second memory means and maintaining a receiving state in the radio channel;

fifth control means which, when calling to said child unit, (1) reads the channel number stored in the second memory means and tunes said second transceiver to the radio channel, (2) determines if the radio channel is usable or not, (3) sends the response signal to said child unit through the radio channel if the radio channel is usable, and (4) switches the radio channel to a second radio channel in the first limited channel group if the radio channel is not usable, determines if the second radio channel is usable, and if usable, sends the response signal to said child unit through the second radio channel;

sixth control means for providing the channel number of the one radio channel into said second memory means, and said parent unit i) scans all of the plurality of channels for a signal indicating a response of said child unit to the signal from said parent unit and ii) establishes a radio link between said parent unit and said child unit.

10. The radio apparatus of claim 9, wherein said first control means controls said transceiver to perform intermittent receiving to scan for the response signal at predetermined time intervals.

11. The radio apparatus of claim 1, 5, 7, or 9, wherein said first control means determines a specific number of channels separated by a number of channels on the basis of said cardinal point as said first limited channel group.

12. The radio apparatus of claim 5, wherein said second control means determines a specific number of channels separated by a number of channels on the basis of said cardinal point as said second limited channel group.

13. The radio apparatus of claim 7, wherein said third control means determines a specific number of channels separated by a number of channels on the basis of said cardinal point as said first channel group.

14. The radio apparatus of claim 9, wherein said fifth control means determines a specific number of channels separated by a number of channels on the basis of said cardinal point as said first limited channel group.

\* \* \* \* \*

UNITED STATES PATENT AND TRADEMARK OFFICE
CERTIFICATE OF CORRECTION

PATENT NO. : 5,799,241
DATED : August 25, 1998
INVENTOR(S) : Matsubara et al.

It is certified that error appears in the above-identified patent and that said Letters Patent is hereby corrected as shown below:

Column 10, line 32, insert "for" after --channel--.

Signed and Sealed this

Twenty-fourth Day of August, 1999

Attest:

Q. TODD DICKINSON

*Attesting Officer*         *Acting Commissioner of Patents and Trademarks*